US012111826B1

United States Patent
Chaidaroon et al.

(10) Patent No.: US 12,111,826 B1
(45) Date of Patent: Oct. 8, 2024

(54) NEURAL SEARCH FOR PROGRAMMING-RELATED QUERY ANSWERING

(71) Applicant: Amazon Technologies, Inc., Seattle, WA (US)

(72) Inventors: Suthee Chaidaroon, Sunnyvale, CA (US); Xiao Zhang, Redmond, WA (US); Shruti Subramaniyam, Seattle, WA (US); Sidharth Gulati, Mountain View, CA (US); Jeffrey Thomas Svajlenko, Redmond, WA (US); Iman Keivanloo, Sammamish, WA (US); Rick Nayar, Issaquah, WA (US); Regina M Joy, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/194,543

(22) Filed: Mar. 31, 2023

(51) Int. Cl.
    *G06F 17/30*     (2006.01)
    *G06F 16/242*     (2019.01)
    *G06F 16/2457*     (2019.01)

(52) U.S. Cl.
    CPC ...... *G06F 16/242* (2019.01); *G06F 16/24575* (2019.01)

(58) Field of Classification Search
    CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 10,963,497 | B1* | 3/2021 | Tablan | G06F 16/3344 |
| 11,055,355 | B1* | 7/2021 | Monti | G06F 16/90332 |
| 11,429,834 | B1* | 8/2022 | Xue | G06F 40/284 |
| 2003/0033318 | A1* | 2/2003 | Carlbom | G06F 16/784 |
| | | | | 707/999.102 |
| 2005/0080614 | A1* | 4/2005 | Bennett | G10L 15/30 |
| | | | | 704/E15.04 |
| 2007/0078870 | A1* | 4/2007 | Jensen | G06F 16/243 |
| 2010/0191686 | A1* | 7/2010 | Wang | G06F 16/334 |
| | | | | 707/E17.014 |

(Continued)

OTHER PUBLICATIONS

Alon, U., Brody, S., Levy, O., and Yahav, E. (2019). "code2seq: Generating sequences from structured representations of code". In International Conference on Learning Representations, pp. 1-22.

(Continued)

*Primary Examiner* — Hung D Le
(74) *Attorney, Agent, or Firm* — Alexander A. Knapp; Kowert, Hood, Munyon, Rankin & Goetzel, P.C.

(57) ABSTRACT

Systems and methods for training and performing query answering for programming related query answering are disclosed. During a training phase, queries and answers of a training dataset may be encoded as vectors into the Euclidean space. Loss values for query-answer pairs, duplicate queries, and augmented queries may be determined using loss functions and may be used to adjust the model of the encoder. During the operation phase, a query may be received and encoded into the Euclidean space. The encoded answer most proximate to the encoded query may be decoded and provided as the most relevant answer.

20 Claims, 10 Drawing Sheets

(56) References Cited

U.S. PATENT DOCUMENTS

| | | | | |
|---|---|---|---|---|
| 2011/0283099 | A1* | 11/2011 | Nath | H04L 9/008 708/405 |
| 2012/0215769 | A1* | 8/2012 | Isaacson | G06F 16/9024 707/E17.014 |
| 2019/0147108 | A1* | 5/2019 | Liu | G06N 5/041 707/706 |
| 2019/0362003 | A1* | 11/2019 | Zhang | G06F 16/24535 |
| 2019/0377824 | A1* | 12/2019 | Wang | G06N 5/022 |
| 2020/0117742 | A1* | 4/2020 | Huang | G06F 16/24564 |
| 2020/0167427 | A1* | 5/2020 | Filoti | G06N 3/08 |
| 2020/0226163 | A1* | 7/2020 | Boxwell | G06N 5/02 |
| 2021/0081503 | A1* | 3/2021 | Tran | G06N 3/08 |
| 2021/0216576 | A1* | 7/2021 | Staub | G06Q 30/0282 |
| 2022/0121824 | A1* | 4/2022 | Hu | G06F 40/30 |
| 2022/0138432 | A1* | 5/2022 | Galitsky | G06F 40/211 704/9 |
| 2022/0150078 | A1* | 5/2022 | Soryal | H04L 9/3226 |
| 2022/0164538 | A1* | 5/2022 | Bornea | G06F 40/30 |
| 2022/0179848 | A1* | 6/2022 | Tran | G06F 40/35 |
| 2022/0318501 | A1* | 10/2022 | Alexander | G06F 40/30 |
| 2022/0351634 | A1* | 11/2022 | Wen | G06F 18/24 |
| 2022/0400159 | A1* | 12/2022 | Chi | G06N 3/084 |
| 2022/0405313 | A1* | 12/2022 | Banipal | G06N 3/047 |
| 2022/0414381 | A1* | 12/2022 | Gautam | G10L 19/02 |
| 2023/0016157 | A1* | 1/2023 | Ferreira Moreno | G06N 5/022 |
| 2023/0035338 | A1* | 2/2023 | Zheng | G06F 16/3347 |
| 2023/0049839 | A1* | 2/2023 | Chen | G06F 16/3349 |
| 2023/0060159 | A1* | 3/2023 | Rajasekar | G06F 16/3329 |
| 2023/0129094 | A1* | 4/2023 | Lauritzen | G06N 3/045 707/706 |
| 2023/0177363 | A1* | 6/2023 | Li | G06F 40/279 706/45 |
| 2023/0186147 | A1* | 6/2023 | Sen | G06N 5/04 706/12 |
| 2023/0244934 | A1* | 8/2023 | Lazaridou | G06N 3/08 706/25 |
| 2023/0342411 | A1* | 10/2023 | Popat | G06F 16/9538 |
| 2024/0020515 | A1* | 1/2024 | Zeighami | G06N 3/084 |
| 2024/0086501 | A1* | 3/2024 | Osborn | G06F 21/31 |
| 2024/0087187 | A1* | 3/2024 | Wooters | G06T 11/206 |

OTHER PUBLICATIONS

Arabzadeh, N., Bigdeli, A., Seyedsalehi, S., Zihayat, M., and Bagheri, E. (2021). "Matches made in heaven: Toolkit and large-scale datasets for supervised query reformulation". In Proceedings of the 30th ACM International Conference on Information and Knowledge Management, CIKM '21, p. 4417-4425, New York, NY, USA. Association for Computing Machinery.

Brandt, J., Guo, P. J., Lewenstein, J., Dontcheva, M., and Klemmer, S. R. (2009). Two studies of opportunistic programming: Interleaving web foraging, learning, and writing code. In Proceedings of the SIGCHI Conference on Human Factors in Computing Systems, CHI '09, p. 1589-1598, New York, NY, USA. Association for Computing Machinery.

Cao, K., Chen, C., Baltes, S., Treude, C., and Chen, X. (2021). "Automated query reformulation for efficient search based on query logs from stack overflow". In 2021 IEEE/ACM 43rd International Conference on Software Engineering (ICSE), pp. 1273-1285.

Chen, J., Mao, J., Liu, Y., Zhang, F., Zhang, M., and Ma, S. (2021). "Towards a better understanding of query reformulation behavior in web search". In Proceedings of the Web Conference 2021, WWW '21, p. 743-755, New York, NY, USA. Association for Computing Machinery.

Guo, D., Lu, S., Duan, N., Wang, Y., Zhou, M., and Yin, J. (2022). "UniXcoder: Unified Cross-Modal Pre-training for Code Representation". arXiv:2203.03850 [cs], pp. 1-14.

Haiduc, S., Bavota, G., Marcus, A., Oliveto, R., De Lucia, A., and Menzies, T. (2013). "Automatic query reformulations for text retrieval in software engineering". In 2013 35th International Conference on Software Engineering (ICSE), pp. 842-851, San Francisco, CA, USA. IEEE.

Hill, E., Pollock, L., and Vijay-Shanker, K. (2011). "Improving source code search with natural language phrasal representations of method signatures". In 2011 26th IEEE/ACM International Conference on Automated Software Engineering (ASE 2011), pp. 524-527, Lawrence, KS, USA. IEEE.

Huang, J., Tang, D., Shou, L., Gong, M., Xu, K., Jiang, D., Zhou, M., and Duan, N. (2021). "CoSQA: 20,000+ web queries for code search and question answering". In Proceedings of the 59th Annual Meeting of the Association for Computational Linguistics and the 11th International Joint Conference on Natural Language Processing (vol. 1: Long Papers), pp. 5690-5700, Online. Association for Computational Linguistics.

Iyer, S., Konstas, I., Cheung, A., and Zettlemoyer, L. (2016). "Summarizing Source Code using a Neural Attention Model". In Proceedings of the 54th Annual Meeting of the Association for Computational Linguistics (vol. 1: Long Papers), pp. 2073-2083, Berlin, Germany. Association for Computational Linguistics.

Jain, P., Jain, A., Zhang, T., Abbeel, P., Gonzalez, J., and Stoica, I. (2021). "Contrastive code representation learning". In Proceedings of the 2021 Conference on Empirical Methods in Natural Language Processing, pp. 5954-5971, Online and Punta Cana, Dominican Republic. Association for Computational Linguistics.

Jinqiu Yang and Lin Tan (2012). "Inferring semantically related words from software context". In 2012 9th IEEE Working Conference on Mining Software Repositories (MSR), pp. 161-170, Zurich. IEEE.

Johnson, J., Douze, M., and Jegou, H. (2019). "Billion-scale similarity search with GPUs". IEEE Transactions on Big Data, 7(3): pp. 535-547 (retrieved from arXiv preprint: arXiv:1702.08734v1 [cs. CV] Feb. 28, 2017).

Keivanloo, I., Rilling, J., and Zou Y. 2014, "Spotting working code examples," In Proceedings of the 36th International Conference on Software Engineering, ICSE 2014, pp. 664-675, Association for Computing Machinery.

Loshchilov, I. and Hutter, F. (2019). "Decoupled weight decay regularization". In International Conference on Learning Representations, arXiv: 1711.05101v3 [cs.LG] Jan. 4, 201, pp. 1-19.

Lv, F., Zhang, H., Lou, J .-g., Wang, S., Zhang, D., and Zhao, J. (2015). "CodeHow: Effective Code Search Based on API Understanding and Extended Boolean Model (E)". In 2015 30th IEEE/ACM International Conference on Automated Software Engineering (ASE), pp. 260-270, Lincoln, NE, USA. IEEE.

Nogueira, R., Lin, J., and Epistemic, A. (2019a). "From doc2query to docttttttquery". Online preprint, 6, pp. 1-3.

Nogueira, R., Yang, W., Lin, J., and Cho, K. (2019). "Document expansion by query prediction". arXiv preprint arXiv: 1904.08375, pp. 1-7.

Raffel, C., Shazeer, N., Roberts, A., Lee, K., Narang, S., Matena, M., Zhou, Y., Li, W., and Liu, P. J. (2020). "Exploring the limits of transfer learning with a unified text-to-text transformer". Journal of Machine Learning Research, 21(140): pp. 1-67.

Sachdev, S., Li, H., Luan, S., Kim, S., Sen, K., and Chandra, S. (2018). "Retrieval on source code: a neural code search". In Proceedings of the 2nd ACM SIGPLAN International Workshop on Machine Learning and Programming Languages, pp. 31-41, Philadelphia PA USA. ACM.

Sridhara, G., Hill, E., Pollock, L., and Vijay-Shanker, K. (2008). "Identifying Word Relations in Software: A Comparative Study of Semantic Similarity Tools". In 2008 16th IEEE International Conference on Program Comprehension, pp. 123-132, Amsterdam. IEEE.

Xia, X., Bao, L., Lo, D., Xing, Z., Hassan, A. E., and Li, S. (2018). "Measuring program comprehension: A large-scale field study with professionals". IEEE Transactions on Software Engineering, 44(10): pp. 951-976.

Xiong, L., Xiong, C., Li, Y., Tang, K .-F., Liu, J., Bennett, P. N., Ahmed, J., and Overwijk, A. (2021). "Approximate nearest neighbor negative contrastive learning for dense text retrieval". In International Conference on Learning Representations, pp. 1-16.

Zügner, D., Kirschstein, T., Catasta, M., Leskovec, J., and Gunnemann, S. (2021). "Language-agnostic representation earning of source

(56) References Cited

OTHER PUBLICATIONS code from structure and context". In International Conference on Learning Representations (ICLR), pp. 1-22.

* cited by examiner

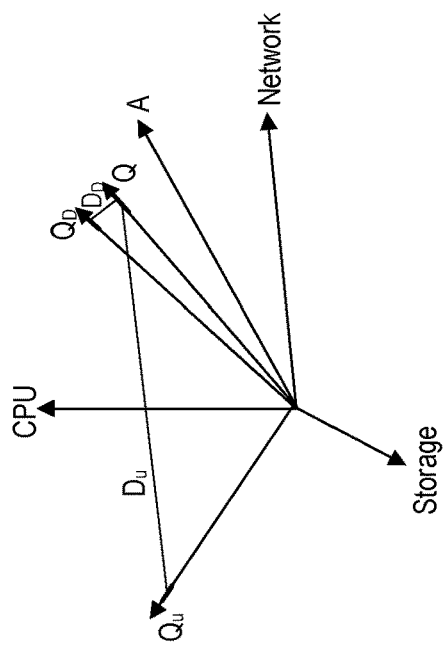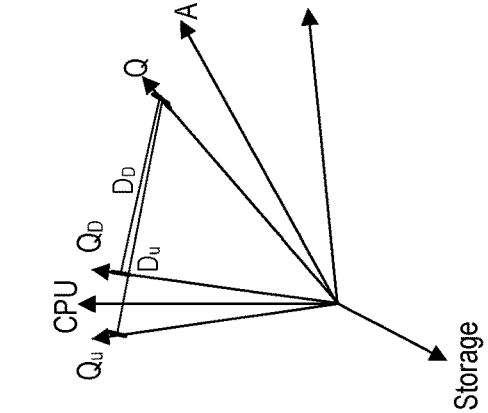
FIG. 4

*Continued from block 812*

Generate using a generative model, additional query-answer pairs to augment the programming related training data
814

Determine contrastive loss values for additional query-answer pairs, wherein the loss value is determined based on comparing a similarity score determined between the encoded additional query vector and the encoded original answer vector and a similarity score determined between an encoded unrelated query vector and an encoded original answer vector
816

Train transformer layers for the encoder using the additional query-answer pairs and the determined contrastive loss values such that for original queries and additional queries corresponding to the same answer, the encoder encodes the additional queries proximate to the original queries in the Euclidean space
818

Perform, using the encoder comprising the trained transformer layers, query answering for programming related queries
820

FIG. 9

NEURAL SEARCH FOR PROGRAMMING-RELATED QUERY ANSWERING

BACKGROUND

Many enterprises implement search engines for query answering. These search engines match queries to existing information in the enterprise's database to determine answers to queries. These search engines may utilize data augmentation for query answering, such as augmenting a query with implied contextual information or transforming a query term into a different format. However, when used to perform query answering for programming related queries, variations in syntax between programs, non-intuitive synonyms used in programming, program syntax formats that deviate for natural language structures, and/or other differences between programming related terms and natural language terms may frustrate such search engines.

BRIEF DESCRIPTION OF THE DRAWINGS

FIG. 4 is a block diagram illustrating a query, a duplicate query, an unrelated query, and an answer encoded in the Euclidean space wherein the encoder performing the encoding has been trained to place the duplicate query closer to the query than the unrelated query based on a duplicative query contrastive loss analysis, according to some embodiments.

FIGS. 8-9 is a flow diagram illustrating a process of training transformer layers of an encoder for performing query answering based on contrastive loss values for query-answer pairs, duplicative queries, and additional (e.g., augmented) query-answer pairs, according to some embodiments.

Figure 1:
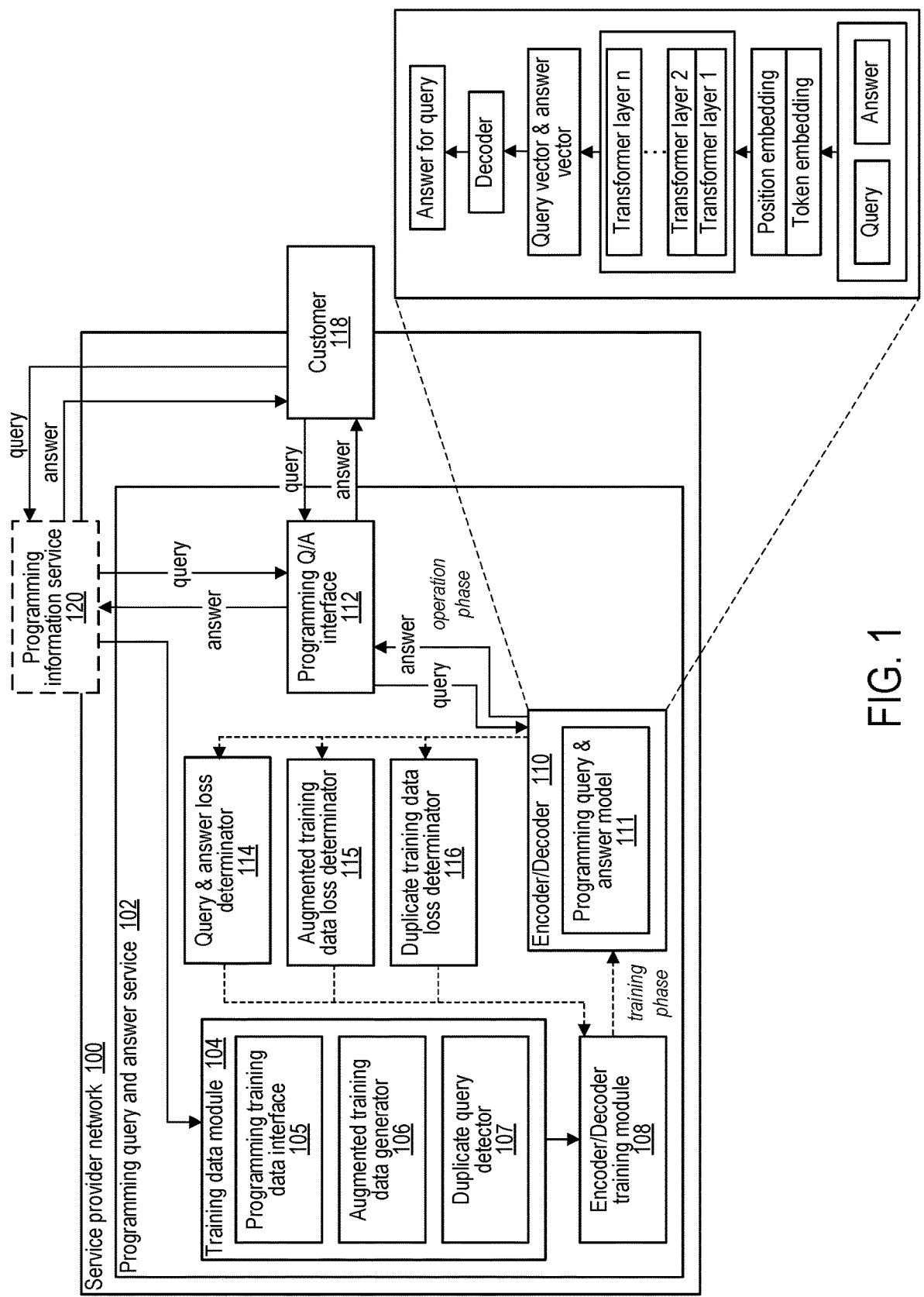
FIG. 1 is a block diagram illustrating a service provider network, wherein an encoder and decoder are trained based on programming related training data and augmented training data for performing query answering, according to some embodiments.

While embodiments are described herein by way of example for several embodiments and illustrative drawings, those skilled in the art will recognize that embodiments are not limited to the embodiments or drawings described. The drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components.

"Configured To." Various units, circuits, or other components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on). The units/components used with the "configured to" language include hardware—for example, circuits, memory storing program instructions executable to implement the operation, etc. Reciting that a unit/component is "configured to" perform one or more tasks is expressly intended not to invoke 35 U.S.C. § 112, paragraph (f), for that unit/component. Additionally, "configured to" can include generic structure that is manipulated by software or firmware to operate in manner that is capable of performing the task(s) at issue.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

DETAILED DESCRIPTION OF EMBODIMENTS

A significant challenge for programming-related query answering engines is the vocabulary gap between a programming-related query and a possible answer. For example, current methods of query answering fail to understand that abbreviations such as "XWS" and "Company-X Web Service" are referring to the same entity. Such engines also do not recognize synonyms, misspellings, or tokenization. For example, wording such as "XWS-SDK" and "XWS SDK" would not match in such engines. Note the addition or omission of the hyphen may be construed by a query-answering engine as referring to two different terms, even though in the programming language community, such terms are used interchangeably. Some query-answering system may use a neural search model with query reformulation and augmentation to improve performance. However, for such systems, the neural search model must be trained using relevant training data, which is often lacking. For example, the training data would need to include variations, such as X-company web service SDK, XWS-SDK (with hyphen), XWS SDK (without hyphen) etc. Also, treating each term (e.g.—company web service SDK, XWS-SDK (with hyphen), XWS SDK (without hyphen) etc.) as a separate entity in the neural model, may lead to data overfitting or other issues. Nevertheless, reformulation and augmentation, may be used with novel loss functions, as described herein, to further improve programming-related query and answering For example, to address these issues and/or other issues, in some embodiments, a system that trains and implements a query answering neural search model through query reformulation and augmentation, may be trained using data generated using contrastive loss functions that indicate relative losses for duplicated or augmented queries. Additionally, in some embodiments, neural search models may be implemented using dense numerical vectors of lower dimension instead of discrete vectors of high dimension to represent programming queries and answers. Such models may project the query and the answer as vectors and allow for contrastive losses to be calculated. For example, the more correct an answer is for a query, the shorter the distance between the query and answer. Therefore, neural search models can understand abbreviations, recognize synonyms, and handle new questions from a different domain. For example, an exact matching is not required, instead relative closeness can be calculated as a vector distance in the Euclidean space between two encoded vectors in the Euclidean space, such as an encoded question vector and an encoded answer vector, or such as between an original question vector and a vector representing a duplicated query or an augmented query for the original question. While current engines may use neural search models and data augmentation to adjust incoming queries to be answered, such search engines do not consider the use of query reformulation in loss functions used during the training of the model. Said another way, the reformulation may be used to adjust incoming queries to compensate for a model that was not trained on data (without the reformulation). However, in contrast, by using reformulation in loss functions used during training, the reformulated variations may be built into the training of the model and may provide superior results, as compared to previous uses of reformulation to adjust incoming queries.

In some embodiments, to train the query answering model, an initial training dataset including query-answer pairs may be provided. For example, real-world programming-related query and answers may be generated via in an online forum, and may be used as an initial corpus of training data. However, to mitigate against a limited volume of training data, additional queries may be generated and used to augment the initial corpus of training data. Also, any duplicate queries included in the initial corpus of training data may be detected and recognized in the training data. In some embodiments, pre-trained encoders and decoders may then encode the queries and answers of the initial corpus of training data (and/or augmented initial corpus of training data) as vectors in the Euclidean space. The Euclidean space may include two or more axes orthogonal to each other. Loss functions, as further described herein, may evaluate how close the queries and answers are in relation to each other in the Euclidean space, as well as how close duplicate queries are to one another, and how close augmented queries are to original queries that they are augmenting. In some embodiments, the model used by the encoder may be adjusted so that the distances between a query and a related answer and the query and an unrelated answer are encoded in an adjusted manner based on the loss function, so that the related answer is encoded closer to the encoded query than the encoded unrelated answer is to the encoded query. In some embodiments, the model used by the encoder may be adjusted so that the distances between a query and a duplicate query and the query and an unrelated query are also encoded in an adjusted manner based on the loss function, so that the duplicate query is encoded closer to the encoded query than the encoded unrelated query is to the encoded query. In some embodiments, the model used by the encoder may further be adjusted so that the distances between a query and an augmented query and the query and an unrelated query are also encoded in an adjusted manner based on the loss function, so that the augmented query is encoded closer to the encoded query than the encoded unrelated query is to the encoded query. Such values from the loss function may be included in augmented training data and may be used to further adjust the encoder in order to improve the accuracy of the model.

In some embodiments, during operation of the query answering engine, a query is sent to the trained encoder and the query is then encoded into the Euclidean space. The closest encoded answer in the Euclidean space is selected, decoded, and then sent back to the query asker as the closest or correct answer for the query. Such queries may include programming related-queries, and the returned answered may include programming-related answers to the programming-related queries.

As will be appreciated by those skilled in the art, features of the system disclosed herein may be implemented in computer systems to solve technical problems in the state of the art and to improve the functioning of the computer systems. For example, as discussed above, and as discussed in more detail below, such features of the system improve programming-related query answering and provide more accurate answers for programming-related queries in a way that more efficiently uses computing resources to generate the more accurate answers than prior approaches. These and other features and advantages of the disclosed system are discussed in further detail below, in connection with the figures.

FIG. 1 is a block diagram illustrating a service provider network, wherein an encoder and decoder are trained based on programming related training data and augmented training data for performing query answering, according to some embodiments.

In some embodiments, the training and operation of a programming related query and answering is performed, such as by a programming query and answer service 102 of a service provider network 100, and may resemble embodiments as shown in FIG. 1. In some embodiments, A programming information service 120 may provide training data to a training data module 104.

For example, in some embodiments, programming information service 120 may be an online forum where users may exchange programming related questions and answers. In some embodiments programming information service 120 may include an internal forum, such as customer questions submitted to a help desk and answers provided back to the customers by the help desk. The programming information service 120 may be inside or outside of the service provider network 100. The training data module 104 may include a programming training data interface 105, an augmented training data generator 106, and a duplicate query detector 107. In some embodiments, the programming training data interface 105 may act as the interface that receives or accesses the training data, such as from the programming information service 120. The augmented training data generator 106 may generate additional queries (e.g., augmented queries) for query-answer pairs and add the additional queries to the training dataset. The augmented queries may be queries generated by the system that refer to an existing answer in the training data. Thus, the additional or augmented queries may be similar to duplicated queries, but may differ in the sense that the augmented queries are added to the training data whereas the duplicated queries already existed in the training data. The duplicate query detector 107 may scan the training data for variations of the same query and label every variation of the same query after the first same query as a duplicate. In some embodiments, the training data may then be provided to an encoder/decoder training module 108. The encoder/decoder training module 108 may then begin a training phase that provides a programming query & answer model 111 to an encoder/decoder 110.

The encoder of the encoder/decoder 110 may then encode the queries, augmented queries, duplicate queries, and answers into the Euclidean space as vectors using embedding and transformer layers. Such information may then be provided to a query & answer loss determinator 114, an augmented training data loss determinator 115, and a duplicate training data loss determinator 116. The loss values determined may then be provided to the encoder/decoder training module 108 to improve the programming query & answer model 111 so that a correct answer to a query is encoded close to the encoded query in the Euclidean space. The training phase may continue until the determined loss values are below determined thresholds. Likewise, loss values may be determined and provided to the encoder/decoder training module 108 to improve the programming query & answer model 111 so that duplicate (and augmented) queries are encoded close to one another and therefore are also encoded close to the matching corresponding answer.

The query & answer loss determinator 114 may use a query-answer loss function to compare the distance between an encoded query and an encoded related answer and the distance between the encoded query and an encoded unrelated answer. As the training phase continues, the loss value of the query & answer loss determinator 114 may be minimized so that the distance between the encoded query and the encoded related answer is shorter than the distance between the encoded query and the encoded unrelated answer.

The augmented training data loss determinator 115 may use an augmented query loss function to compare the distance between an encoded query and an encoded augmented query and the distance between the encoded query and an encoded unrelated query. As the training phase continues, the loss value of the augmented training data loss determinator 115 may be minimized so that the distance between the encoded query and the encoded augmented query is shorter than the distance between the encoded query and the encoded unrelated query.

The duplicate training data loss determinator 116 may use a duplicate query loss function to compare the distance between an encoded query and an encoded duplicate query and the distance between the encoded query and an encoded unrelated query. As the training phase continues, the loss value of the duplicate training data loss determinator 116 may be minimized so that the distance between the encoded query and the encoded duplicate query is shorter than the distance between the encoded query and the encoded unrelated query.

In some embodiments, during an operation phase, the encoder/decoder 110 may receive a query from a programming Q/A interface 112. The query may then be encoded into the Euclidean space. The encoded answer closest to the encoded query in the Euclidean space may be selected as the answer to the query, decoded by the decoder of the encoder/decoder 110, and provided to the programming Q/A interface 112. In some embodiments, a customer 118 may provide the query and receive the answer directly from the programming Q/A interface 112. In such embodiments, the customer 118 may represent an engineer of the programming query and answer service 102. In some embodiments, the customer 118 may provide the query to and receive the answer from a programming information service 120, which then may provide the query to and receive the answer from the programming Q/A interface 112. In some embodiments, the customer 118 may be the user of a query answering engine in the programming information service 120.

Figure 2:
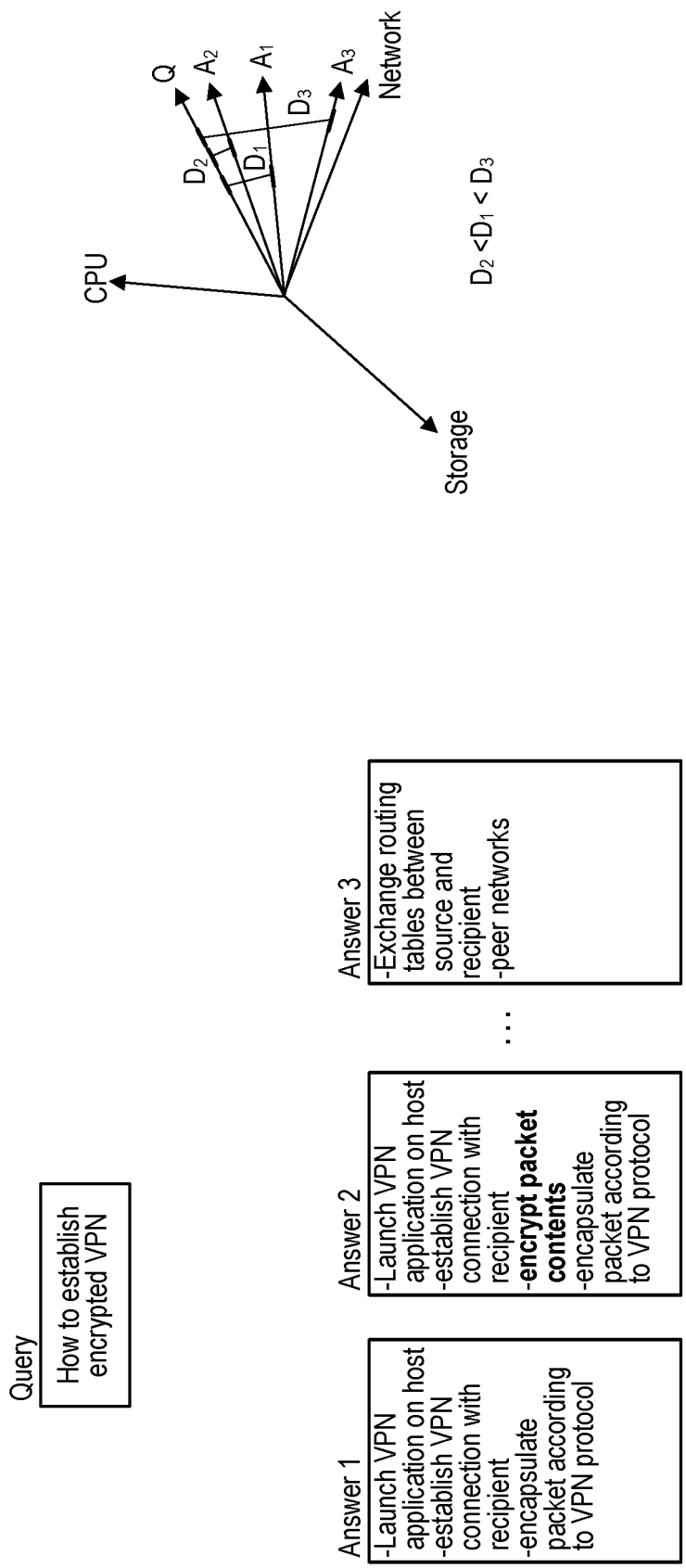
FIG. 2 is a block diagram illustrating a query and three example answers encoded in a Euclidean space, as well as respective distances between the query and the three respective example answers. Such an encoding into a Euclidean space may be used for selecting a correct answer for a given query, according to some embodiments.

FIG. 2 is a block diagram illustrating a query and three example answers encoded in a Euclidean space, as well as respective distances between the query and the three respective example answers. Such an encoding into a Euclidean space may be used for selecting a correct answer for a given query, according to some embodiments.

Some embodiments, such as shown in FIG. 1, may include further features such as shown in FIG. 2. For example, in some embodiments, the operation phase of query answering, such as described herein, may be performed, in a manner such as shown in FIG. 2. During the operation phase, a query may state "How to establish encrypted VPN?" Once encoded, the query may have multiple possible answers. The multiple encoded answers' distances to the encoded query in the Euclidean space may be compared to determine the correct answer. For example, such as shown in FIG. 2, a first answer may include only part of the answer for the query, such as how to establish a VPN, a second answer may include the whole answer for the query, such as how to establish an "encrypted" VPN, and a third answer may be unrelated to the query, such as exchanging routing tables. In FIG. 2, the Euclidean space may be demonstrated with a 3D graph with axes including CPU, Network, and Storage. Note that these axes are given solely as examples and in some embodiments, different query-answer domains may be used as encoding axes. Also, for case of illustration three-dimensional vectors are used, but in some embodiments more or fewer dimensions may be used to encode queries and answers. In some embodiments, the Euclidean space may include two or more axes orthogonal to each other.

The encoded query may be represented by vector Q, the encoded first answer may be represented by vector $A_1$, the encoded second answer may be represented by vector $A_2$, and the encoded third answer may be represented by vector $A_3$. Because the second answer may be the most relevant to the query, the distance $D_2$ between vector Q and vector $A_2$ may be shortest compared to the distance $D_1$ between vector Q and vector $A_1$ and the distance $D_3$ between vector Q and vector $A_3$. Because the first answer may be more relevant to the query than the third answer, the distance $D_1$ between vector Q and vector $A_1$ may be shorter than distance $D_3$ between vector Q and vector $A_3$. In such embodiments, the second answer may be selected as the correct answer and provided to an asker of the query. For example, when the model is trained the vector of the correct answer will be encoded in the Euclidean space nearest the vector of the encoded query. In this way, a vector distance can be computed between the vector of the encoded query and the nearest answer vectors in the Euclidean space, wherein the closest answer vector (and its corresponding answer) is selected as the answer for the query.

Figure 3:
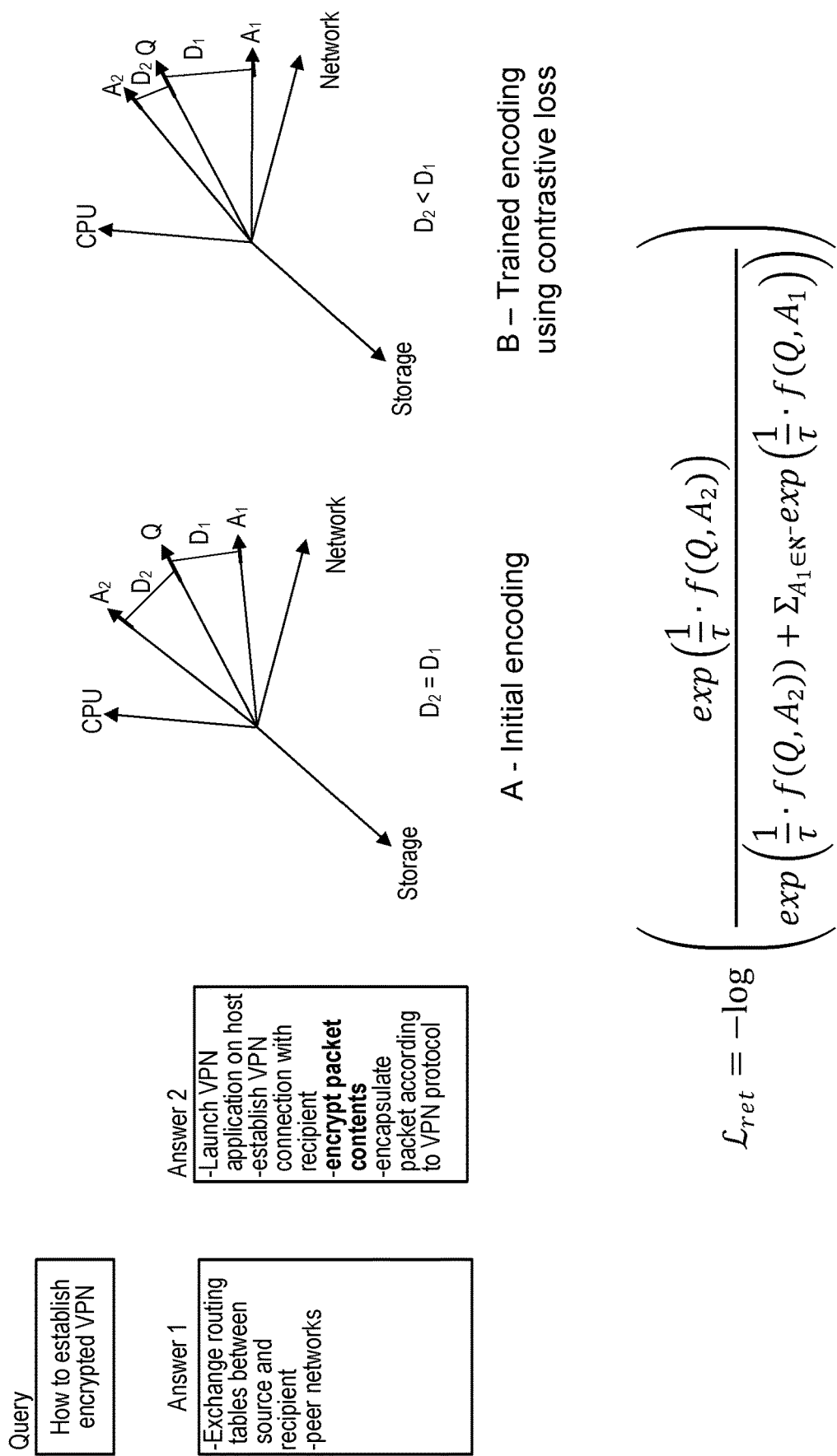
FIG. 3 is a block diagram illustrating a query, a related answer, and an unrelated answer encoded in the Euclidean space, wherein the encoder performing the encoding has been trained to place the related answer closer to the query than the unrelated answer based on a query-answer contrastive loss analysis, according to some embodiments.

FIG. 3 is a block diagram illustrating a query, a related answer, and an unrelated answer encoded in the Euclidean space, wherein the encoder performing the encoding has been trained to place the related answer closer to the query than the unrelated answer based on a query-answer contrastive loss analysis, according to some embodiments.

Some embodiments, such as shown in FIGS. 1 and 2, may include further features such as shown in FIG. 3. For example, in some embodiments, training of the encoder, such as those described herein, may be performed using a query and answer loss function, such as in FIG. 3. In such embodiments, a query, a first answer that is an unrelated answer to the query, and a second answer that is a related answer to the query may be used as part of training the encoder such as for performing the query and answers from FIG. 2. To perform the training, the encoder may be initially pretrained, where the training further improves upon the initial pre-trained state. The encoder, such as the encoder of the encoder/decoder 110 from FIG. 1, may initially encode the query, the related answer, and the unrelated answer into the Euclidean space as vectors as shown in graph A. In some embodiments, the axes of the Euclidean space may be storage, CPU, and Network (as a few examples, though others may be used). In some embodiments, two or more orthogonal axes may be included in the Euclidean space. In graph A, the distance $D_1$ between the encoded unrelated answer $A_1$ and the encoded query Q may equal the distance $D_2$ between the encoded related answer $A_2$ and the encoded query Q. The encoded query and the encoded answers may be used in a query-answer contrastive loss function, such as shown below:

$$\mathcal{L}_{reL} = -\log\left(\frac{\exp\left(\frac{1}{\tau} \cdot f(Q, A_2)\right)}{\exp\left(\frac{1}{\tau} \cdot f(Q, A_2) + \sum_{A_1 \in N} -\exp\left(\frac{1}{\tau} \cdot f(Q, A_1)\right)\right)}\right)$$

The query-answer contrastive loss function (above) uses the vectors of the encoded queries and encoded answers to determine a loss value, $\mathcal{L}_{ret}$. A constant, $\tau$, controls the shape of the distribution. The noise distribution may be represented by $N^-$. Because the related answer and unrelated answer are known to be related and unrelated to the query respectively, the loss value represents how inaccurate the encoded query and encoded answers are positioned in relation to each other in the Euclidean space. The loss value may then be used to adjust the model for the encoder. For example, as shown in FIG. 1, the query & answer loss determinator 114 performs the loss function and sends the information to the encoder/decoder training module 108 to train the encoder/decoder 110. The training phase may continue until a threshold for the loss value is reached.

Graph B may represent the query and answers encoded by the trained encoder using contrastive loss. The positions of each of the vectors in relation to each other may be more accurate than the initial encoding. As shown in FIG. 2, the related answer may be encoded closer to the query than the unrelated answer by the trained encoder. Once trained, query answering may be performed, such that the related answer may be selected as the correct answer to the query due to positioning in the Euclidean space.

FIG. 4 is a block diagram illustrating a query, a duplicate query, an unrelated query, and an answer encoded in the Euclidean space wherein the encoder performing the encoding has been trained to place the duplicate query closer to the query than the unrelated query based on a duplicative query contrastive loss analysis, according to some embodiments.

Some embodiments, such as shown in FIGS. 1, 2 and 3, may include further features, such as shown in FIG. 4. For example, in some embodiments, training of the encoder, such as those described herein, may be performed using a query and duplicate query loss function, such as shown in FIG. 4. In such embodiments, a query, a duplicate query to the query, and an unrelated query to the query may be part of a training data set for training the encoder. To perform the duplicate query loss training, the encoder may first be pretrained (for example as described above). The encoder, such as the encoder of the encoder/decoder 110 from FIG. 1, may initially encode the query, the duplicate query, and the unrelated query into the Euclidean space as vectors as shown in graph A. In some embodiments, the axes of the Euclidean space may be storage, CPU, and Network (as a few examples, though others may be used). In graph A, the distance $D_D$ between the encoded duplicate query $Q_D$ and the encoded query Q may almost equal the distance $D_u$ between the encoded unrelated query $Q_u$ and the encoded query Q. The encoded queries may be used in a duplicate query contrastive loss function, such as shown below:

$$\mathcal{L}_q = \max(f(Q,Q_D) - f(Q,Q_u) + \zeta, 0)$$

The duplicate query contrastive loss function uses the vectors of the encoded queries and encoded answers to determine a loss value, $\mathcal{L}_q$. The constant, $\xi$, may represent a margin value. Because the duplicate query and the unrelated query are known to be related and unrelated to the query respectively, the loss value represents how inaccurate the encoded queries are positioned in relation to each other in the Euclidean space. The loss value may then be used to adjust the model for the encoder. For example, as shown in FIG. 1, the duplicate training data loss determinator 116 performs the loss function and sends the information to the encoder/decoder training module 108 to train the encoder/decoder 110. The training phase may continue until a threshold for the loss value is reached.

Graph B may represent the query and answers encoded by the trained encoder using duplicate query contrastive loss. The positions of each of the vectors in relation to each other may be more accurate than the initial encoding. The duplicate query may be encoded obviously closer to the query than the unrelated query by the trained encoder. Once trained, query answering may be performed, such that the related answer may be selected as the correct answer to the query and to the duplicate query due to positioning in the Euclidean space.

Figure 5:
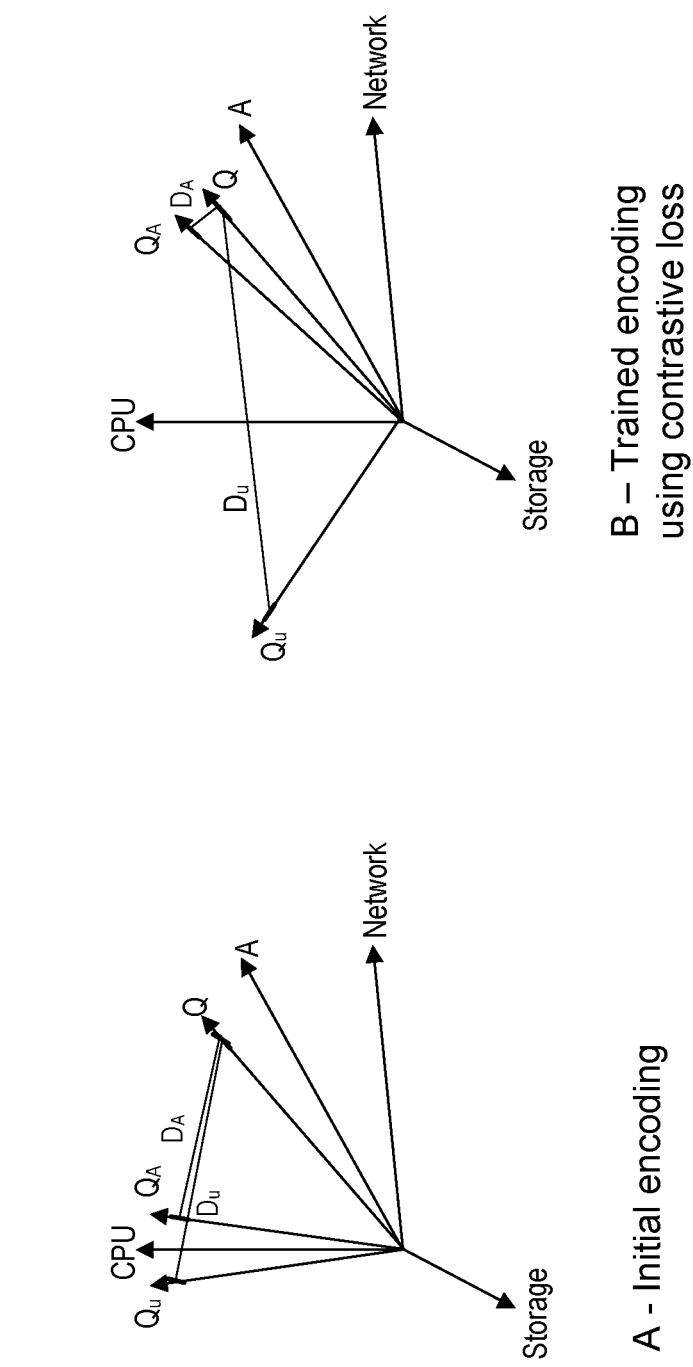
FIG. 5 is a block diagram illustrating a query, an augmented query, an unrelated query, and an answer encoded in the Euclidean space wherein the encoder performing the encoding has been trained to place the augmented query closer to the query (that it is augmenting) than the unrelated query based on a duplicative query contrastive loss analysis, according to some embodiments. Note that in some embodiments, an augmented query may function as a duplicate query. However, the augmented query may be generated as part of the training as opposed to being included in the received training data, which is typically the case for a duplicative query.

FIG. 5 is a block diagram illustrating a query, an augmented query, an unrelated query, and an answer encoded in the Euclidean space wherein the encoder performing the encoding has been trained to place the augmented query closer to the query (that it is augmenting) than the unrelated query based on a duplicative query contrastive loss analysis, according to some embodiments. Note that in some embodiments, an augmented query may function as a duplicate query. However, the augmented query may be generated as part of the training as opposed to being included in the received training data, which is typically the case for a duplicative query.

Some embodiments, such as shown in FIGS. 1, 2, 3, and 4 may include further features, such as shown in FIG. 5. For example, in some embodiments, training of the encoder, such as those described herein, may be performed using a query and augmented query loss function, such as in FIG. 5. In such embodiments, a query, an augmented query, and an unrelated query to the query may be part of a training data set for training the encoder. The augmented query may be generated by a separate model based on the same answer for the query. To perform the augmented query loss training, the encoder may first be pretrained (as described above). The encoder, such as the encoder of the encoder/decoder 110 from FIG. 1, may initially encode the query, the augmented query, and the unrelated query into the Euclidean space as vectors as shown in graph A. In some embodiments, the axes of the Euclidean space may be storage, CPU, and Network (as a few examples, though others may be used). In graph A, the distance $D_A$ between the encoded augmented query $Q_A$ and the encoded query Q may almost equal the distance $D_u$ between the encoded unrelated query $Q_u$ and the encoded query Q. The encoded queries may be used in an augmented query contrastive loss function, such as shown below:

$$\mathcal{L}_a = \alpha(Q_A) \cdot \mathcal{L}_q(Q, Q_A, Q_u)$$

The augmented query contrastive loss function uses the vectors of the encoded queries and encoded answers to determine a loss value, $\mathcal{L}_A$. A confidence score, $\alpha(Q_A)$, may be used to filter some augmented queries in order to reduce the effect of any ill-formed augmented queries. Additionally, or alternatively, the contrastive loss may be used to improve encoding of augmented queries that approach a corresponding original query in similarity such that the augmented queries function as duplicate queries. The loss function, $\mathcal{L}_q$, may be defined as shown in FIG. 4. Because the augmented query and the unrelated query are known to be related and unrelated to the query respectively, the loss value, $\mathcal{L}_A$, represents how inaccurate the encoded queries are positioned in relation to each other in the Euclidean space. The loss value may then be used to adjust the model for the encoder. For example, as shown in FIG. 1, the augmented training data loss determinator 115 performs the loss function and sends the information to the encoder/decoder training module 108 to train the encoder/decoder 110. The training phase may continue until a threshold for the loss value is reached.

In some embodiments, the query & answer loss determinator 114, the augmented training data loss determinator 115, and the duplicate training data loss determinator 116 may be performed simultaneously to determine respective loss values. The query & answer loss determinator 114, the augmented training data loss determinator 115, and the duplicate training data loss determinator 116 may also be performed in pairs or one at a time. For example, if during the training phase the encoded queries and encoded answers do not include any duplicate queries, then only the query & answer loss determinator 114 and the augmented training data loss determinator 115 may perform their respective loss functions. Another example may be if no augmented queries are encoded, then the augmented training data loss determinator 115 may not determine the loss value $\mathcal{L}_A$.

Graph B may represent the query and answers encoded by the trained encoder using contrastive loss. The positions of each of the vectors in relation to each other may be more accurate than the initial encoding. The augmented query may be encoded obviously closer to the query than the unrelated query by the trained encoder. Once trained, query answering may be performed, such that the related answer may be selected as the correct answer to the query and to the augmented query due to positioning in the Euclidean space.

Figure 6:
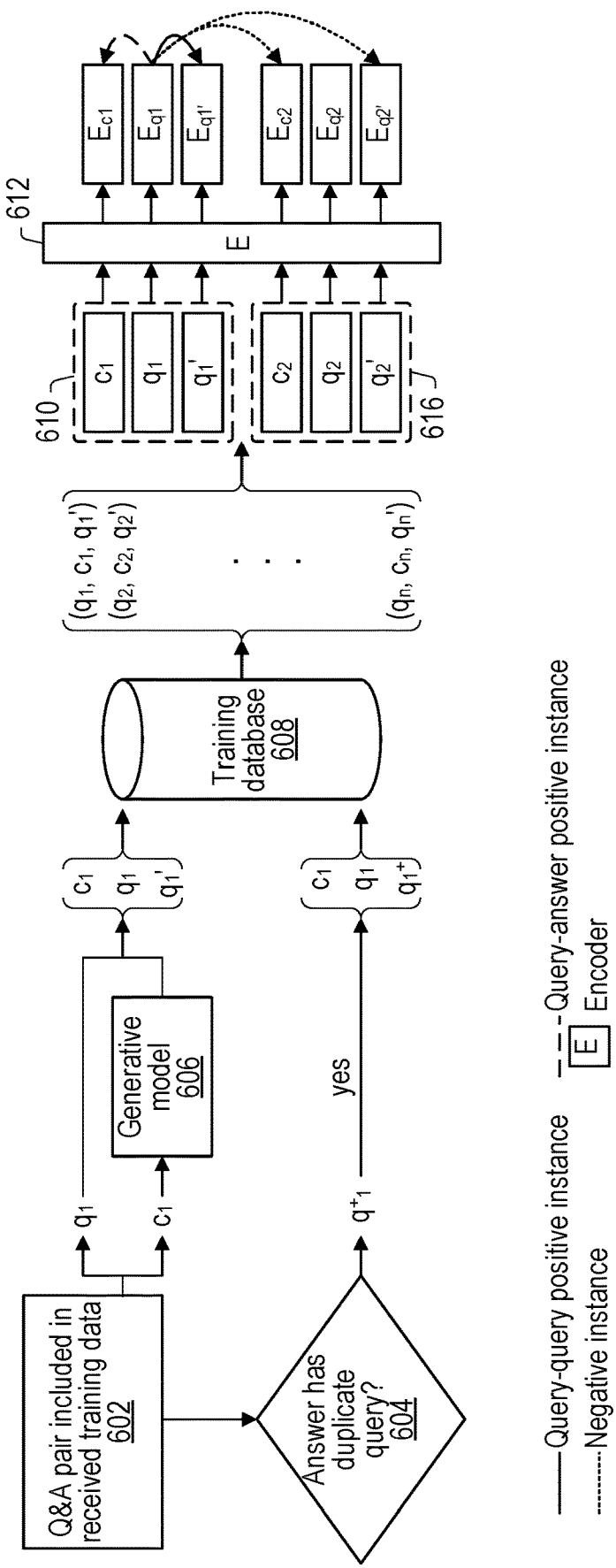
FIG. 6 is a block diagram illustrating training data being encoded in the Euclidean space wherein the training data includes queries, duplicate queries, augmented queries, and answers such that the encoded training data that are related to one another (e.g., query/duplicate query/augmented query corresponding to a same answer) are located close to one another in the Euclidean space as compared to unrelated encoded training data, according to some embodiments.

FIG. 6 is a block diagram illustrating training data being encoded in the Euclidean space wherein the training data include queries, duplicate queries, augmented queries, and answers such that encoded training data that are related are close in the Euclidean space compared to unrelated encoded training data, according to some embodiments.

Some embodiments, such as shown in FIGS. 1, 2, 3, 4, and 5 may include further features, such as shown in FIG. 6. For example, in some embodiments, generating and encoding the training data set, such as those described herein, may be performed such as in FIG. 6. A query $q_1$ of a Q&A pair included in the received training data 602 may be provided to a training database 608. An answer $c_1$ of the Q&A pair included in received training data 602 may be inputted in a generative model 606 to generate an augmented query $q'_1$. The answer $c_1$ and augmented query $q'_1$ may then be provided with the query $q_1$ to the training database 608. Block 604 checks whether the answer $c_1$ has a duplicate query. If the answer $c_1$ has a duplicate query $q_1^+$ a new vector including the answer $c_1$, query $q_1$, and duplicate query $q_1^+$ may be added to the training database 608.

The training database 608 may provide the training data to the encoder 612. The encoder 612 may then encode the training data as shown with the vector of queries and answer 610 and the vector of queries and answer 616 being encoded in FIG. 6. A query-answer positive instance may be represented with the encoded query and encoded answer of 610. A query-query positive instance may be represented with the encoded queries of 610. A negative instance may be represented by the encoded query of 610 and the encoded answer and augmented query of 616.

Figure 7:
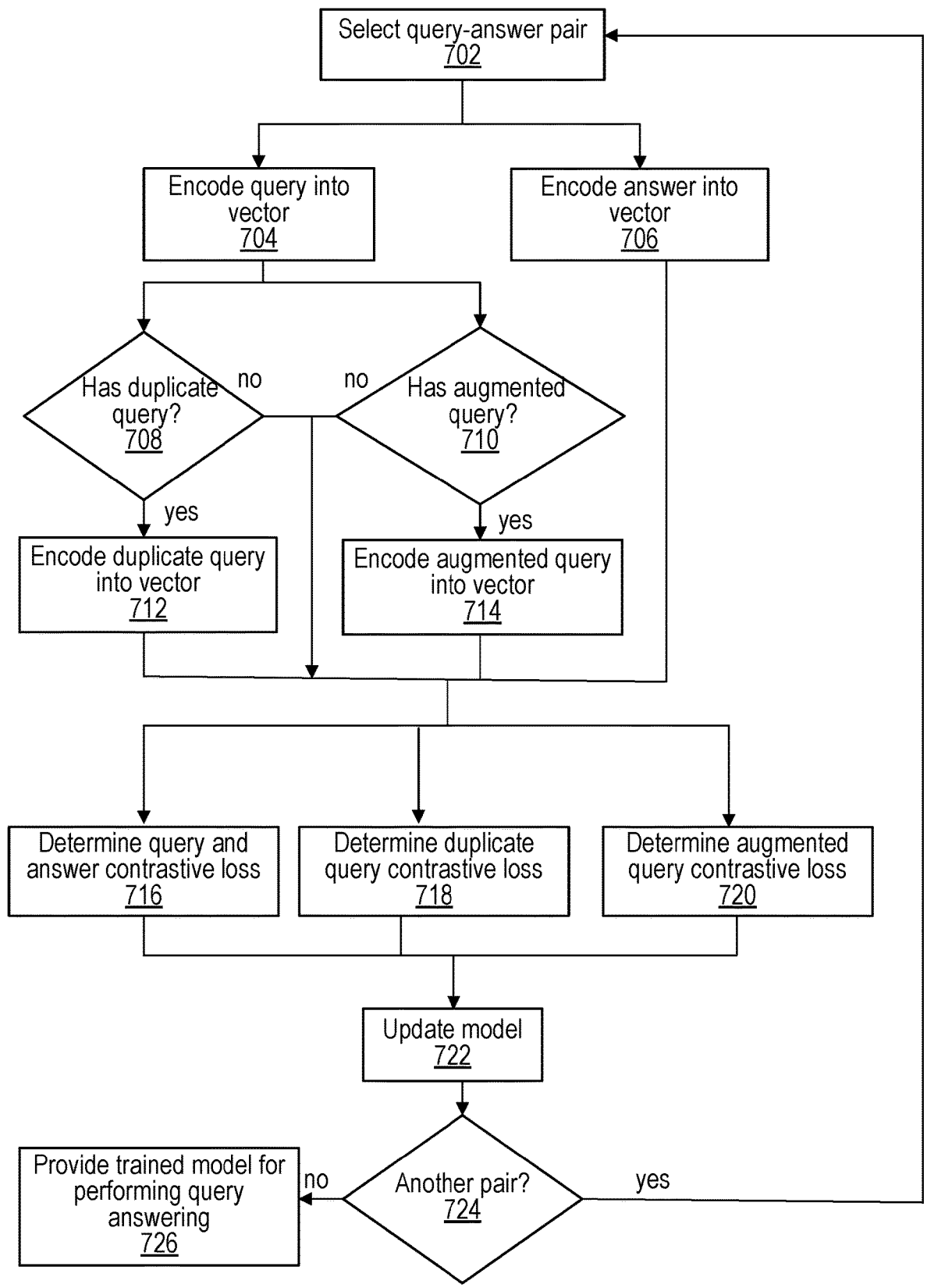
FIG. 7 is a flow diagram illustrating a process of training a model for programming-related query answering based on contrastive losses of: queries and answers, duplicative queries, and augmented queries, according to some embodiments.

FIG. 7 is a flow diagram illustrating a process of training a model for query answering based on contrastive losses of queries and answers, duplicative queries, and augmented queries, according to some embodiments.

In some embodiments, a process for training a model for query answering may resemble a process such as that which is shown in FIG. 7. In block 702, a query-answer pair may be selected from a training dataset. In block 704, the query of the query-answer pair may be encoded into a vector. In block 706, the answer of the query-answer pair may be encoded into a vector. Block 708 checks if there is a duplicate query of the query. If there is a duplicate query, the duplicate query may be encoded into a vector in block 712. Block 710 checks if there is an augmented query. If there is an augmented query, the augmented query may be encoded into a vector in block 714.

In block 716, a query and answer contrastive loss may be determined. In block 718, a duplicate query contrastive loss may be determined. In block 720, an augmented query contrastive loss may be determined. In block 722, the model is updated based on the determined losses from block 716, 718, and 720. Block 724 checks if there is another query-answer pair. If there is another query-answer pair, the process may repeat again at block 702. If there is not another query-answer pair, the trained model may be provided for performing query answering in block 726.

Figure 8:
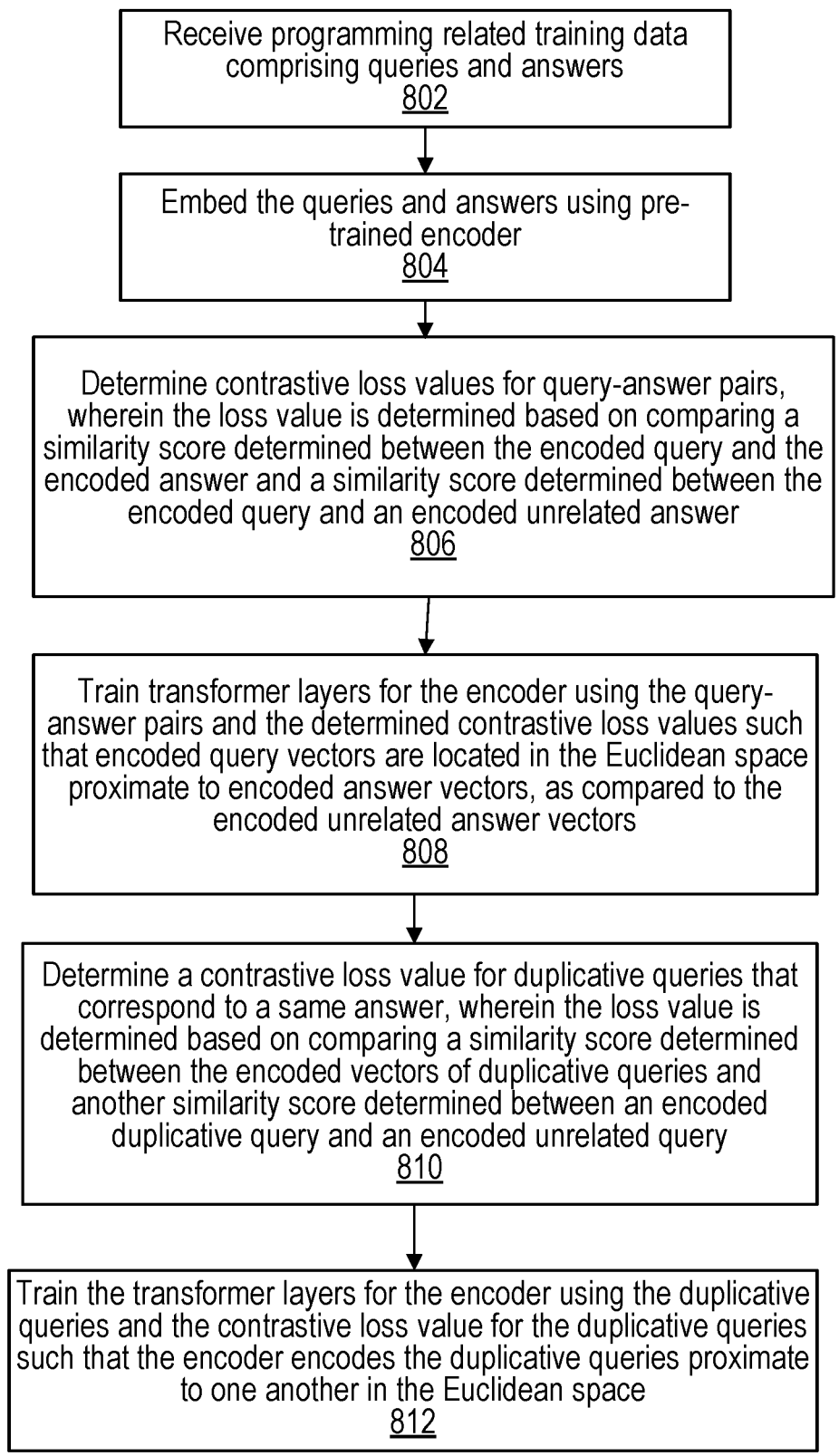

FIGS. 8-9 is a flow diagram illustrating a process of training transformer layers of an encoder for performing query answering based on contrastive loss values for query-answer pairs, duplicative queries, and additional query-answer pairs, according to some embodiments.

In some embodiments, a process for training transformer layers of an encoder for performing query answering may resemble a process such as that which is shown in FIGS. 8-9. In block 892, programming related training data comprising queries and answers may be received. In block 804, the pre-trained encoder may embed the queries and answers. In block 806, contrastive loss values for query-answer pairs may be determined based on comparing a similarity score of the encoded query and the encoded answer and a similarity score of the encoded query and encoded unrelated answer. In block 808, the transformer layers for the encoder may be trained using the determined query-answer contrastive loss values, such that the encoded queries are located in the Euclidean space proximate to encoded answers as compared to encoded unrelated answers.

In block 810, contrastive loss values for duplicative queries may be determined based on comparing a similarity score of the encoded query and an encoded duplicative query and a similarity score of the encoded query and the encoded unrelated query. In block 812, the transformer layers for the encoder may be trained using the determined duplicative query contrastive loss values, such that the encoded queries are located in the Euclidean space proximate to encoded duplicate queries as compared to encoded unrelated queries.

In block 814, additional query-answer pairs may be generated and added to the programming related training data. In block 816, contrastive loss values for additional query-answer pairs may be determined based on comparing a similarity score of the encoded query and an encoded additional query and a similarity score of the encoded query and the encoded unrelated query. In block 818, the transformer layers for the encoder may be trained using the determined additional query contrastive loss values, such that the encoded queries are located in the Euclidean space proximate to encoded additional queries as compared to encoded unrelated queries. In block 820, query answering for programming related queries may be performed using the encoder with training transformer layers.

Figure 10:
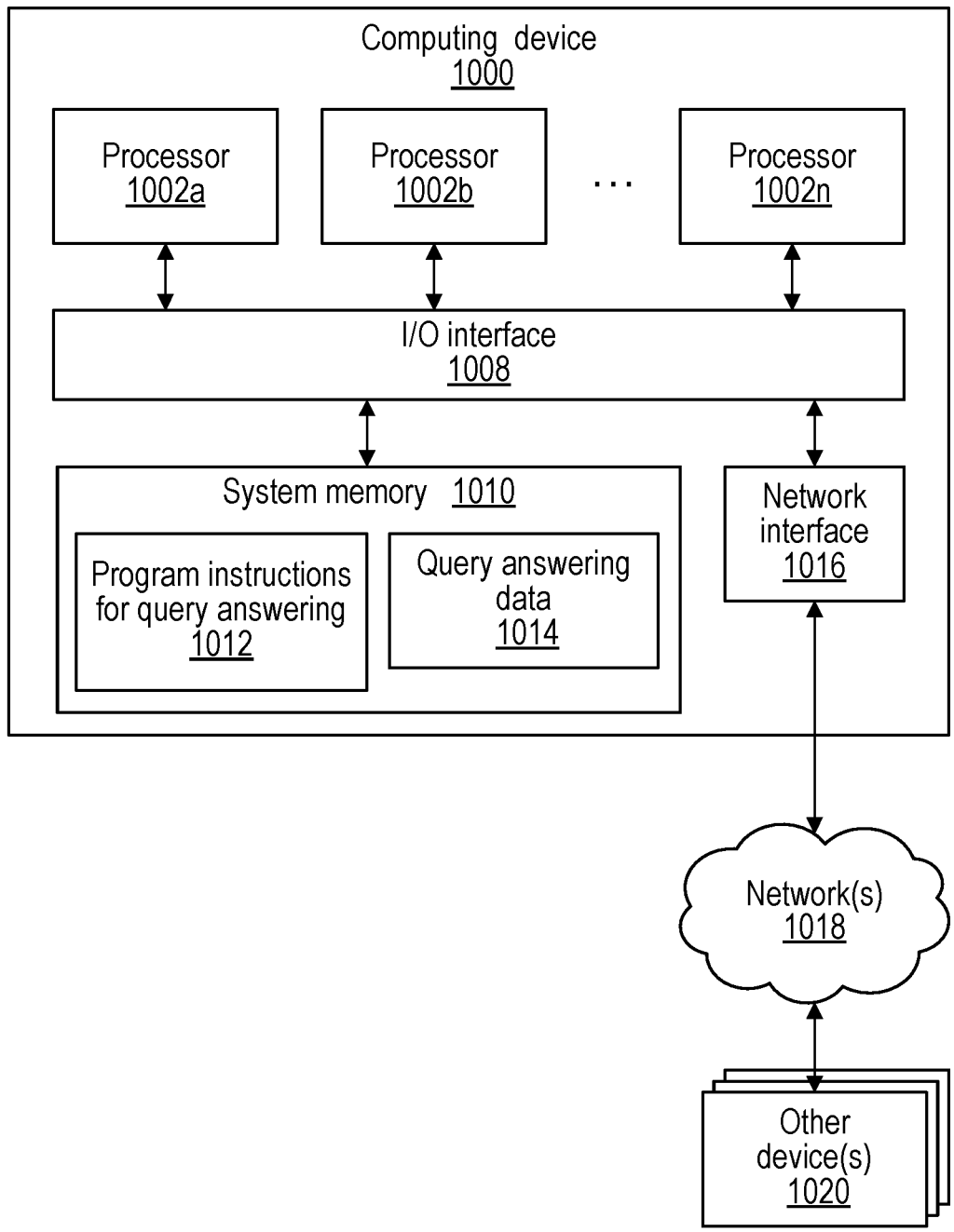
FIG. 10 is a block diagram illustrating an example computer system that implements portions of the query answering service described herein, according to some embodiments.

FIG. 10 is a block diagram illustrating an example computer system that implements portions of the query answering service described herein, according to some embodiments.

In at least some embodiments, a server that implements a portion or all of one or more of the technologies described herein, including the techniques for performing query answering, may include a general-purpose computer system that includes or is configured to access one or more computer-accessible media. FIG. 10 illustrates such a general-purpose computing device 1000. In the illustrated embodiment, computing device 1000 includes one or more processors 1002 coupled to a system memory 1010 (which may comprise both non-volatile and volatile memory modules) via an input/output (I/O) interface 1008. Computing device 1000 further includes a network interface 1016 coupled to I/O interface 1008.

In various embodiments, computing device 1000 may be a uniprocessor system including one processor 1002, or a multiprocessor system including several processors 1002 (e.g., two, four, eight, or another suitable number). Processors 1002 may be any suitable processors capable of executing instructions. For example, in various embodiments, processors 1002 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA. In some implementations, graphics processing units (GPUs) may be used instead of, or in addition to, conventional processors.

System memory 1010 may be configured to store instructions and data accessible by processor(s) 1002. In at least some embodiments, the system memory 1010 may comprise both volatile and non-volatile portions; in other embodiments, only volatile memory may be used. In various embodiments, the volatile portion of system memory 1010 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery).

In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1010 as program instructions for query answering 1012 and query answering data 1014. For example, program instructions for query answering 1012 may include program instructions for implementing a programming query and answer service, such as programming query and answer service 102 illustrated in FIG. 1. Also, in some embodiments, program instructions for query answering 1012 may include program instructions for implementing components of a programming query and answer service, such as training data module 104, encoder/decoder training module 108, query & answer loss determinator 114, augmented training data loss determinator 115, duplicate training data loss determinator 116, encoder/decoder 110, programming Q/A interface 112, etc.

In one embodiment, I/O interface 1008 may be configured to coordinate I/O traffic between processor 1002, system memory 1010, and any peripheral devices in the device, including network interface 1016 or other peripheral interfaces such as various types of persistent and/or volatile storage devices. In some embodiments, I/O interface 1008 may perform any necessary protocol, timing, or other data transformations to convert data signals from one component (e.g., system memory 1010) into a format suitable for use by another component (e.g., processor 1002).

In some embodiments, I/O interface 1008 may include support for devices attached through various types of peripheral buses, such as a variant of the Peripheral Component Interconnect (PCI) bus standard or the Universal Serial Bus (USB) standard, for example. In some embodiments, the function of I/O interface 1008 may be split into two or more separate components, such as a north bridge and a south bridge, for example. Also, in some embodiments some or all of the functionality of I/O interface 1008, such as an interface to system memory 1010, may be incorporated directly into processor 1002.

Network interface 1016 may be configured to allow data to be exchanged between computing device 1000 and other devices 1020 attached to a network or networks 1018, such as other computer systems or devices as illustrated in FIG. 1 through FIG. 9, for example. Additionally, network interface 1016 may support communication via telecommunications/telephony networks such as analog voice networks or digital fiber communications networks, via storage area networks such as Fibre Channel SANs, or via any other suitable type of network and/or protocol.

In some embodiments, system memory 1010 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 1000 via I/O interface 1008. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 800 as system memory 1010 or another type of memory.

In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 1016.

Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system comprising:
one or more computing devices configured to:
  receive programming related training data comprising queries and answers;
  implement an encoder that is initially pre-trained to perform initial embedding of the queries and the answers;
  determine contrastive loss values for query-answer pairs, wherein a query of a given query-answer pair is encoded as a vector in Euclidean space and a corresponding answer of the given query-answer pair is encoded as another vector in the Euclidean space, and wherein a contrastive loss value for the given query-answer pair is determined based on comparing a similarity score determined between the encoded query vector and the corresponding encoded answer vector and another similarity score determined between the encoded query vector and an encoded unrelated answer vector;
  train transformer layers for the encoder using the query-answer pairs and the determined contrastive loss values for the respective query-answer pairs such that encoded query vectors are located in the Euclidean space proximate to encoded answer vectors for the respective query-answer pairs, as compared to the encoded unrelated answer vectors; and
  perform, using the encoder comprising the trained transformer layers, query answering for programming related queries.

2. The system of claim 1, wherein the one or more computing devices are further configured to:
  determine a contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given one of the encoded vectors for the set of duplicative queries and an encoded vector for an unrelated query;

train the transformer layers for the encoder using the set of duplicative queries and the determined contrastive loss value for the set of duplicative queries such that the encoder encodes the duplicative queries proximate to one another in the Euclidean space.

3. The system of claim 1, wherein the one or more computing devices are further configured to:
generate, using a generative model, additional query-answer pairs to augment the programming related training data such that an augmented version of the programming related training data comprises original query-answer pairs and the additional query-answer pairs;
determine contrastive loss values for the additional query-answer pairs in the additional queries of the additional query-answer pairs are encoded as vectors in the Euclidean space, and wherein a given contrastive loss value for a given one of the additional query-answer pairs is determined based on comparing:
  a similarity score determined between an encoded vector for the additional query of the given additional query-answer pair and the encoded vector for a given original query of an original query-answer pair, wherein the additional query and the given original query correspond to a same answer; and
  another similarity score determined between an encoded vector for an unrelated query and the encoded vector for the given original query of the original query-answer pair, wherein the unrelated query and the given original query are not selected to correspond to the same answer; and
train the transformer layers for the encoder using the additional query-answer pairs and the determined contrastive loss values for the additional query-answer pairs in the augmented version of the programming related training data such that, for original queries and additional queries corresponding to the same answer, the encoder encodes the additional queries of the additional query-answer pairs proximate to the original queries in the Euclidean space.

4. The system of claim 3, wherein the one or more computing devices are further configured to:
determine an additional contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given one of the encoded vectors for the set of duplicative queries and an encoded vector for an unrelated query;
further train the transformer layers for the encoder using the set of duplicative queries and the determined additional contrastive loss value for the set of duplicative queries such that the encoder encodes the duplicative queries proximate to one another in the Euclidean space.

5. A non-transitory, computer-readable medium storing program instructions that, when executed using one or more processors, cause the one or more processors to:
implement an encoder that is initially pre-trained to perform initial embedding of programming-related queries and answers;

determine contrastive loss values for query-answer pairs, wherein a query of a given query-answer pair is encoded as a vector in Euclidean space and a corresponding answer of the given query-answer pair is encoded as another vector in the Euclidean space, and wherein a contrastive loss value for the given query-answer pair is determined based on comparing a similarity score determined between the encoded query vector and the corresponding encoded answer vector and another similarity score determined between the encoded query vector and an encoded unrelated answer vector;
train transformer layers for the encoder using the query-answer pairs and the determined contrastive loss values for the respective query-answer pairs such that encoded query vectors are located in the Euclidean space proximate to encoded answer vectors for the respective query-answer pairs, as compared to the encoded unrelated answer vectors; and
provide the encoder comprising the trained transformer layers for performing query answering.

6. The non-transitory, computer-readable medium storing program instructions of claim 5, wherein the contrastive loss values for query-answer pairs are determined using a triplet loss function.

7. The non-transitory, computer-readable medium storing program instructions of claim 6, wherein the programming instructions when executed on or across the one or more processors further cause the one or more processors to:
determine a contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given on of the encoded vectors for the set of duplicative queries and an encoded vector for an unrelated query; and
train the transformer layers for the encoder using the set of duplicative queries and the determined contrastive loss value for the set of duplicative queries such that the encoder encodes the duplicative queries proximate to one another in the Euclidean space.

8. The non-transitory, computer-readable medium storing program instructions of claim 7, wherein the contrastive loss value for the set of duplicative queries is determined using an additional triplet loss function.

9. The non-transitory, computer-readable medium storing program instructions of claim 6, wherein the programming instructions when executed on or across the one or more processors further cause the one or more processors to:
generate, using a generative model, additional query-answer pairs to augment the programming related training data such that an augmented version of the programming related training data comprises original query-answer pairs and the additional query-answer pairs;
determine contrastive loss values for the additional query-answer pairs in the additional queries of the additional query-answer pairs are encoded as vectors in the Euclidean space, and wherein a given contrastive loss value for a given one of the additional query-answer pairs is determined based on comparing:

a similarity score determined between an encoded vector for the additional query of the given additional query-answer pair and the encoded vector for a given original query of an original query-answer pair, wherein the additional query and the given original query correspond to a same answer; and another similarity score determined between an encoded vector for an unrelated query and the encoded vector for the given original query of the original query-answer pair, wherein the unrelated query and the given original query are not selected to correspond to the same answer; and train the transformer layers for the encoder using the additional query-answer pairs and the determined contrastive loss values for the additional query-answer pairs in the augmented version of the programming related training data such that, for original queries and additional queries corresponding to the same answer, the encoder encodes the additional queries of the additional query-answer pairs proximate to the original queries in the Euclidean space.

10. The non-transitory, computer-readable medium storing program instructions of claim 9, wherein the programming instructions when executed on or across the one or more processors further cause the one or more processors to:

determine an additional contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given one of the encoded vectors for the set of duplicative queries and an encoded vector for an unrelated query;

further train the transformer layers for the encoder using the set of duplicative queries and the determined additional contrastive loss value for the set of duplicative queries such that the encoder encodes the duplicative queries proximate to one another in the Euclidean space.

11. The non-transitory, computer-readable medium storing program instructions of claim 5, wherein the determined similarity scores are determined using a cosine similarity function.

12. A method, comprising:
implementing an encoder that is initially pre-trained to perform initial embedding of programming-related queries and answers;
determining contrastive loss values for query-answer pairs, wherein a query of a given query-answer pair is encoded as a vector in Euclidean space and a corresponding answer of the given query-answer pair is encoded as another vector in the Euclidean space, and wherein a contrastive loss value for the given query-answer pair is determined based on comparing a similarity score determined between the encoded query vector and the corresponding encoded answer vector and another similarity score determined between the encoded query vector and an encoded unrelated answer vector;
training transformer layers for the encoder using the query-answer pairs and the determined contrastive loss values for the respective query-answer pairs such that encoded query vectors are located in the Euclidean space proximate to encoded answer vectors for the respective query-answer pairs, as compared to the encoded unrelated answer vectors; and
providing the encoder comprising the trained transformer layers for performing query answering.

13. The method of claim 12, wherein the contrastive loss values for query-answer pairs are determined using a triplet loss function.

14. The method of claim 13, further comprising:
determining a contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given on of the encoded vectors for the set of duplicative queries and an encoded vector for an unrelated query; and
training the transformer layers for the encoder using the set of duplicative queries and the determined contrastive loss value for the set of duplicative queries such that the encoder encodes the duplicative queries proximate to one another in the Euclidean space.

15. The method of claim 14, wherein the contrastive loss value for the set of duplicative queries is determined using an additional triplet loss function.

16. The method of claim 13, further comprising:
generating, using a generative model, additional query-answer pairs to augment the programming related training data such that an augmented version of the programming related training data comprises original query-answer pairs and the additional query-answer pairs;
determining contrastive loss values for the additional query-answer pairs in the additional queries of the additional query-answer pairs are encoded as vectors in the Euclidean space, and wherein a given contrastive loss value for a given one of the additional query-answer pairs is determined based on comparing:
a similarity score determined between an encoded vector for the additional query of the given additional query-answer pair and the encoded vector for a given original query of an original query-answer pair, wherein the additional query and the given original query correspond to a same answer; and
another similarity score determined between an encoded vector for an unrelated query and the encoded vector for the given original query of the original query-answer pair, wherein the unrelated query and the given original query are not selected to correspond to the same answer; and
training the transformer layers for the encoder using the additional query-answer pairs and the determined contrastive loss values for the additional query-answer pairs in the augmented version of the programming related training data such that, for original queries and additional queries corresponding to the same answer, the encoder encodes the additional queries of the additional query-answer pairs proximate to the original queries in the Euclidean space.

17. The method of claim 16, further comprising:
determine an additional contrastive loss value for a set of duplicative queries in the programming related training data that correspond to a same answer in the programming related training data, wherein the duplicative queries are encoded as vectors in the Euclidean space, and wherein the contrastive loss value for the set of duplicative queries is determined based on comparing a similarity score determined between the encoded vectors for the set of duplicative queries and another similarity score determined between a given one of the encoded vectors for the set of duplicative queries and an encoded vector for an unrelated query;

further train the transformer layers for the encoder using the set of duplicative queries and the determined additional contrastive loss value for the set of duplicative queries such that the encoder encodes the duplicative queries proximate to one another in the Euclidean space.

18. The method of claim 13, further comprising:
receiving programming related training data comprising queries and answers.

19. The method of claim 18, wherein the programming related training data is received as unlabeled training data comprising query-answer pairs.

20. The method of claim 13, further comprising:
performing, using the encoder comprising the trained transformer layers, query answering for programming related queries.

* * * * *